United States Patent [19]

Barnhart et al.

[11] Patent Number: 4,745,411
[45] Date of Patent: May 17, 1988

[54] DIGITAL GAIN ADJUSTMENT

[75] Inventors: Warren A. Barnhart, San Jose; Term Kovattana, Menlo Park, both of Calif.

[73] Assignee: Kaiser Electronics, San Jose, Calif.

[21] Appl. No.: 924,534

[22] Filed: Oct. 29, 1986

[51] Int. Cl.⁴ .............................................. H01J 29/70
[52] U.S. Cl. ...................... 342/403; 358/69; 358/174
[58] Field of Search ................... 315/403; 358/174, 69

[56] References Cited

U.S. PATENT DOCUMENTS

| | | | |
|---|---|---|---|
| 2,534,557 | 12/1950 | Ostreicher | 315/27 |
| 2,793,292 | 5/1957 | Wolff | 250/36 |
| 3,236,945 | 2/1966 | Dome | 358/174 |
| 3,562,416 | 2/1971 | Korver | 358/174 |
| 3,767,964 | 10/1973 | Varian | 315/27 |
| 3,786,304 | 1/1974 | Jordan | 315/27 |
| 3,983,452 | 9/1976 | Bazin | 315/403 |
| 4,147,963 | 3/1979 | Shiotani | 315/403 |
| 4,149,190 | 4/1979 | Wessler et al. | 358/174 |
| 4,277,729 | 7/1981 | Rodgers | 315/398 |
| 4,318,129 | 3/1982 | Zwirn | 358/174 |
| 4,472,707 | 9/1984 | Wilensky et al. | 358/174 |
| 4,490,653 | 12/1984 | Olmstead | 315/403 |
| 4,636,843 | 1/1987 | Hosono et al. | 358/69 |
| 4,645,987 | 2/1987 | Kiteley et al. | 315/403 |

OTHER PUBLICATIONS

Ohkoshi et al., "A New TV Receiver Employing a Beam-Index Color CRT", 8/81, pp. 444-451.

Primary Examiner—Theodore M. Blum
Assistant Examiner—David Cain
Attorney, Agent, or Firm—Townsend and Townsend

[57] ABSTRACT

A cathode ray tube (CRT)/deflection coil assembly is provided which includes a signature resistor for indicating the deflection sensitivity of the deflection coil. An amplifier circuit with an adjustable gain supplies current to the deflection coil. A gain adjustment circuit measures the value of the signature resistor and provides a signal to the amplifier which varies the gain of the amplifier to compensate for variations in the deflection sensitivity of different deflection coils.

17 Claims, 2 Drawing Sheets

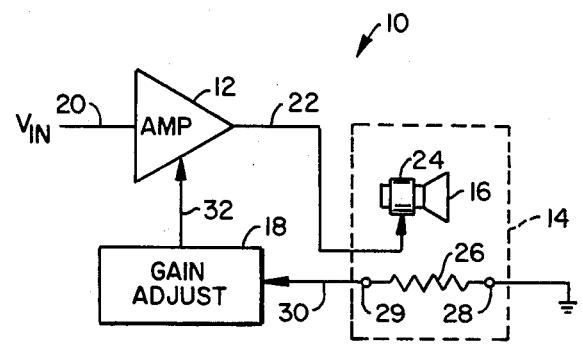
FIG._1.
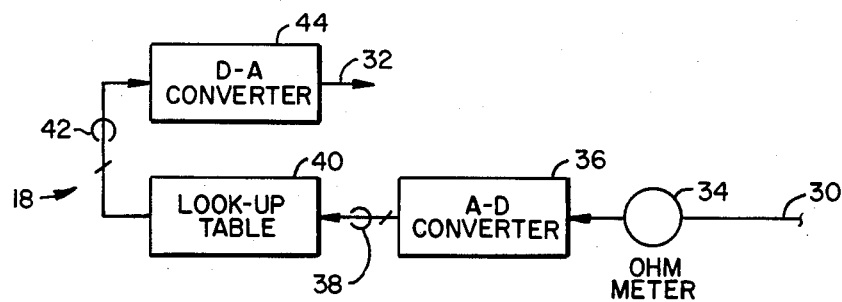
FIG._2.
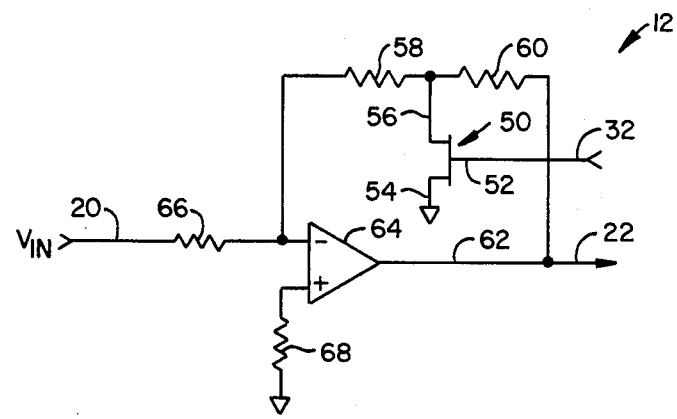
FIG._3.

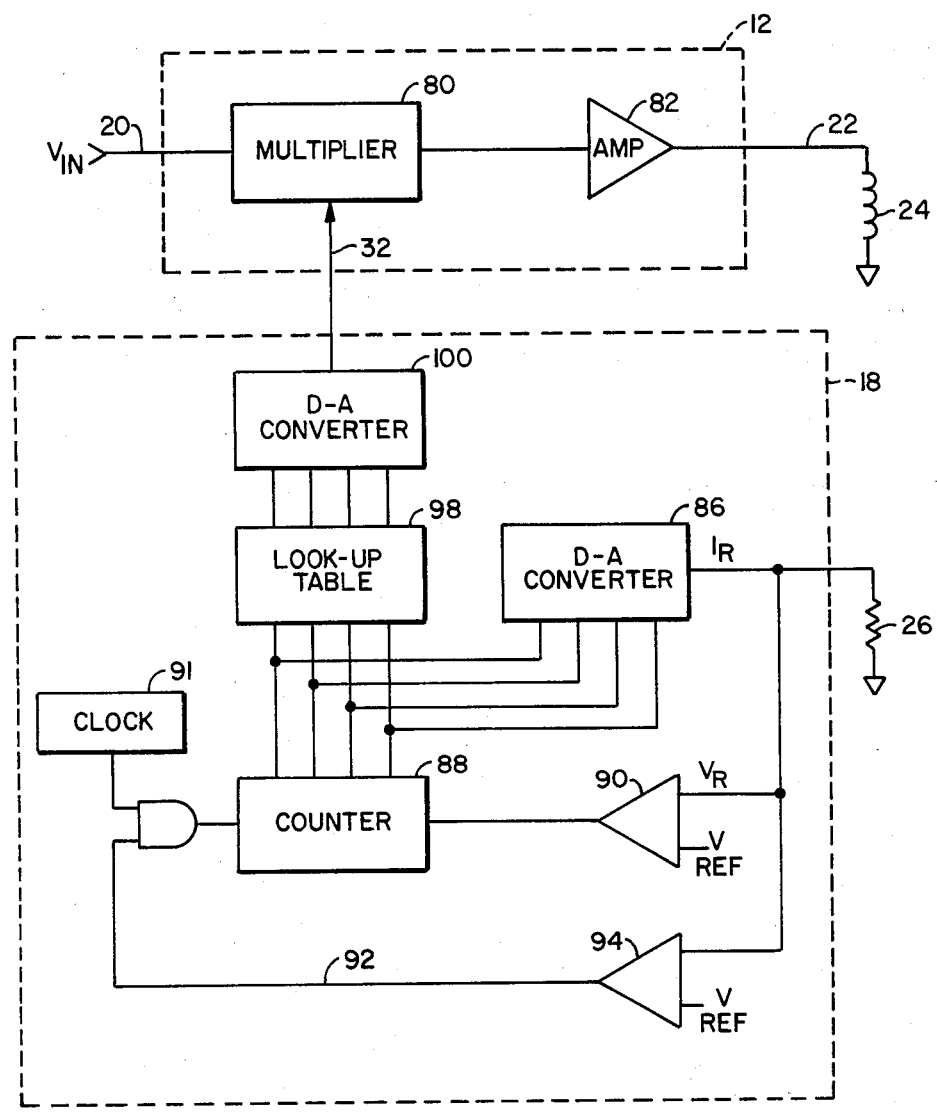
FIG._4.

DIGITAL GAIN ADJUSTMENT

BACKGROUND OF THE INVENTION

The present invention relates to circuits for controlling the deflection of an electron beam in a cathode ray tube, and more particularly it relates to a circuit for deflecting an electron beam in a cathode ray tube to a predetermined angle in response to a predetermined input voltage, independent of the deflection sensitivity of the deflection means.

In cathode ray tubes, deflection means such as a magnetic field deflection coil are used to controllably deflect an electron beam. The angle of deflection of an electron beam traversing the magnetic field produced by the deflection coil, and having a particular acceleration potential, is a function of the value of the current flowing through the deflection coil. The relationship of the angle of deflection to the current flowing in the coil is defined by the transfer function of the deflection coil. The transfer function is generally a linear function for the intended range of operation of the particular deflection coil. The displacement of the electron beam observed at the screen of the cathode ray tube is therefore approximately proportional to the current flowing through the magnetic field deflection coil. The displacement caused at the screen by a unit change in the coil current is the deflection sensitivity of the deflection coil assembly.

Current is supplied to the deflection coil by a power amplifier circuit. By applying a generally sawtooth voltage waveform to the input of the power amplifier circuit, a repeating ramp current can be sent through the deflection coil, thereby causing the electron beam to trace and retrace a vertical or horizontal path on the screen of the cathode ray tube.

When a cathode ray tube having a deflection coil (a CRT/deflection coil assembly) is replaced, the deflection coil of the replacement assembly may have a different deflection sensitivity from that of the replaced coil. This is because deflection coils are manufactured within a specified tolerance range of the exact specifications. If no adjustment is made to the current supplied by the amplifier circuit to the deflection coil, the electron beam will scan a different path from the path produced by the replaced CRT/deflection coil assembly. Therefore, means must be provided for adjusting the current supplied to the coil to compensate for the variation in deflection sensitivity.

In the prior art, an adjustable resistance, or potentiometer, has been included in the circuit between the output of the amplifier and the input to the defelction coil. This potentiometer must be adjusted manually to divert the correct amount of current from the coil to compensate for differences in deflection sensitivity of different deflection coils.

One problem with the use of such a potentiometer is that undesirable noise is introduced. Another problem is the space taken up by the potentiometer. What is needed is a system for providing interchangeability of CRT/deflection coil assemblies without resorting to gain potentiometers on the assemblies.

SUMMARY OF THE INVENTION

The present invention facilitates interchangeability of CRT/deflection coil assemblies by providing, with the assembly, means for measurably indicating the deflection sensitivity of the deflection means. According to the invention, an amplifier circuit, which supplies current to a deflection means in response to an input signal, has an adjustable gain controlled by a gain adjust circuit. The gain adjust circuit is operative to measure the value of the sensitivity indicating means, thereby effectively measuring the deflection sensitivity of the deflection means. The gain adjust circuit then provides a signal which adjusts the gain of the amplifier circuit in response to the measured value of the deflection sensitivity. The amplifier gain can thereby be automatically adjusted to supply a current which will deflect the electron beam a desired determined distance in response to a predetermined input voltage. The adjustment is made electronically by circuitry which is not part of the deflection circuit.

In a preferred embodiment, the means for indicating the deflection sensitivity is a signature resistor. This signature resistor is installed on the CRT/deflection coil assembly after measuring the deflection sensitivity. The value of the signature resistor is measured by the gain adjust circuit according to conventional means. The gain adjust means of this embodiment includes an analog-to-digital converter for converting the measured resistance value to a digital representation, a look-up table for translating the digital resistance value to a digital gain adjustment value, and a digital-to-analog converter for converting the output of the look-up table to an analog value which is supplied to the amplifier circuit to adjust the gain of the amplifier. The amplifier circuit of this embodiment includes a variable resistance device, in a feedback loop, which responds to the gain adjust signal.

In another embodiment, the effective gain of the amplifier circuit is modified by coupling the circuit input and the gain adjustment signal into an analog multiplier which outputs the modified value of the input to a fixed gain amplifier.

BRIEF DESCRIPTION OF THE DRAWINGS

FIG. 1 is a block diagram of a system for practicing the invention.

FIG. 2 is a block diagram showing details of the gain adjust means of FIG. 1.

FIG. 3 is a circuit diagram of an amplifier circuit with adjustable gain of FIG. 1.

FIG. 4 is a circuit diagram of an alternative embodiment of the invention.

DESCRIPTION OF THE PREFERRED EMBODIMENT

Referring to FIG. 1, system 10 for practicing the invention comprises amplifier means 12, CRT/deflection coil assembly 14, and gain adjust means 18. CRT/deflection coil assembly 14 includes deflection coil 24, CRT 16, signature resistor 26, and other parts not shown. Amplifier means 12 receives an input signal waveform $V_{IN}$ via input line 20 and generates an output current on output 22. Magnetic deflection coil 24 receives the current on line 22 and responsively generates a magnetic field for deflecting an electron beam (not shown) in the CRT 16. Signature resistor 26, which is not a part of the deflection coil circuit, is supplied with, and attached to, deflection coil 24 and provided with a value that indicates the deflection sensitivity of deflection coil 24. One terminal 28 of resistor 26 is coupled to a reference potential. Gain adjust means 18 is coupled to the other terminal 29 of signature resistor 26 via line 30 for measuring the value of resistor 26 by one of several conventional techniques. Gain adjust means 18 is also coupled to amplifier means 12 and is operative to adjust the effective gain of the amplifier in response to the measured value of resistor 26 by supplying a gain adjustment signal to amplifier 12 via line 32. The gain of the amplifier is thus automatically and electronically adjusted so that it corresponds to that required by the deflection coil, thereby compensating for variations in the deflection sensitivity of the coil.

The signature resistor can be a single resistor or a network of resistors. The signature resistors are installed on the CRT/deflection coil assembly after measuring the transfer function of the assembly by conventional means. The values of these resistors are assigned in such a manner as to provde an unambiguous identification of the transfer tolerance, within a pre-determined set of ranges. For example, 1000 ohms of resistance = +0.1 to +0.2%, 10K ohms = +5 to +5.1%, etc.

Referring to FIG. 2, details of gain adjust means 18 of this embodiment are shown. Ohm meter 34 measures the resistance of the signature resistor via line 30 by conventional means, such as by supplying current from a precision current source to the resistor and measuring the resulting voltage drop across the resistor. The ohm meter output is coupled to the analog input of analog-to-digital converter 36, where it is converted to a digital value represented by a digital word transmitted onto bus lines 38. This digital word is then passed to a look-up table stored in read-only-memory 40. This table contains the value of the desired gain adjustment as a function of the resistor value. The digital gain adjustment value from the look-up table is output onto bus 42 where it is transmitted to digital-to-analog converter 44. Digital-to-analog converter 44 converts the digital gain adjustment value to an analog gain adjustment signal which is transmitted onto line 32 for transmission to amplifier means 12.

Referring to FIG. 3, details of amplifier means 12 are shown. It will be understood that this is one of several alternative embodiments of the amplifier means, the only essential requirement of the invention being that the effective gain of the amplifier means be adjustable in response to the gain adjustment signal provided via line 32. In this typical embodiment, the gain adjustment is performed by using a variable resistance device in the amplifier feedback loop. The variable resistance device may be an FET (field-effect transistor) 50 with the gain adjust signal 32 coupled to the gate 52 of FET 50. The drain 54 of FET 50 is coupled to a reference potential. The source 56 of the FET is coupled between two fixed resistances 58 and 60 in a feedback loop from output line 62 of amplifier 64 to the inverting input of amplifier 64. Amplifier input $V_{IN}$ is coupled through resistor 66 to the inverting input of amplifier 64. The non-inverting input of amplifier 64 is coupled to the reference potential through resistor 68.

Other typical means for adjusting the gain of the amplifier in response to the gain adjustment signal include controlling bias currents in a transconductance amplifier. A practical implentation of this is an analog multiplier, such as the Gilbert cell or its derivatives.

Referring to FIG. 4, an embodiment of the invention using an analog multiplier to vary the effective gain of the amplifier circuit is shown. Where appropriate, the same numerals will be used to designate features corresponding to those of FIG. 1. Amplifier circuit 12 includes multiplier 80 coupled to fixed gain amplifier 82.

Multiplier 80 receives the circuit input $V_{IN}$, via line 20, and the gain adjustment signal 32 from gain adjust circuit 18. Multiplier 80 outputs the modified input signal to fixed-gain (G) amplifier 82. The current output 22 by amplifier 82 drives deflection coil 24. Multiplier 80 modifies $V_{IN}$ by a variable factor M (determined by the value of gain adjustment signal 32) to complement the sensitivity (S) of deflection coil 24 such that the product $M \times S$ is constant for any value of S.

The deflection produced by the deflection coil is generally proportional to the product $S \times I$ of the deflection coil sensitivity S and the current I through the coil. The current I output by amplifier 82 is proportional to $M \times V_{IN} \times G$. Substituting for I, the deflection produced by the coil in response to $V_{IN}$ is therefore proportional to the product $S \times M \times V_{IN} \times G$. It is seen that, by keeping the product $S \times M$ fixed, the deflection produced by the coil for a particular input $V_{IN}$ is independent of variations in sensitivity S.

The gain adjust circuit 18 of the embodiment of FIG. 4 operates as follows: Digital-to-analog converter 85 converts the digital value of output by up/down counter 88 to current $I_R$, which is proportional to the counter value. Current $I_R$ passes through signature resistor 26, developing voltage drop $V_R$. Voltage $V_R$ is read by comparator 90 and compared to arbitrary reference voltage $V_{REF}$. If $V_R$ is less than $V_{REF}$, counter 88 is directed to count up, increasing the value of current $I_R$. $I_R$ will be increased with every pulse from clock 91 until $V_R$ is substantially equal to $V_{REF}$. If $V_R$ is greater than $V_{REF}$, counter 88 counts down, decreasing $I_R$ until $V_R$ equals $V_{REF}$.

When $V_R$ is substantially equal to $V_{REF}$ the output 92 of window detector 94 goes low, inhibiting clock 90 and thus inhibiting any further changes in the output of counter 88.

The output of counter 88 is a digital word which is inversely proportional to the resistance of signature resistor 26 (and thus inversely proportional to the deflection sensitivity). Counter output 96 is used as an address for a look-up table stored in ROM 98. The look-up table outputs the proper value to input to digital-to-analog converter 100 to produce the analog value of M which complements the sensitivity of deflection coil 24.

These and other variations on the preferred embodiment will be understood by those skilled in the art. The scope of the invention is defined by the appended claims.

What is claimed is:

1. A circuit for deflecting an electrom beam in a cathode ray tube, in response to an input signal from an input signal source, said circuit comprising:

amplifier means for supplying current in response to the input signal, said amplifier means having an input coupled to the input signal source for receiving the input signal, said amplifier means having an output for transmitting the supplied current, and further having a gain adjust input and an adjustable gain, said gain being adjustable in response to a gain adjust signal received at said gain adjust input, said gain defining the value of current supplied at said output in response to the value of the input signal;

deflection means, coupled to the output of said amplifier means, for deflecting an electron beam in response to the current supplied by said amplifier means, said deflection means having a predetermined characteristic deflection sensitivity descriptive of the amount of beam deflection produced in response to the value of the supplied current;

indicating means attached to said deflection means and having a measurable predetermined fixed value for indicating the deflection sensitivity of said deflection means; and gain adjust means coupled to said indicating means for measuring the deflection sensitivity of said deflection means by measuring the value of said indicating means, said gain adjust means being coupled to the gain adjust input of said amplifier means for generating and transmitting to said amplifier means a gain adjust signal for adjusting, in response to said measured deflection sensitivity, the gain of said amplifier.

2. The circuit of claim 1 wherein said gain adjust means are operative to adjust the gain of said amplifier means so that a predetermined amount of beam deflection is produced by said deflection means in response to a predetermined value of the input signal, independently of the deflection sensitivity of said deflection means.

3. The circuit of claim 2 wherein said indicating means comprises a signature resistor having a resistance value indicating the deflection sensitivity of said deflection means, said signature resistor having a first terminal coupled to said gain adjust means and having a second terminal coupled to a reference potential, and wherein said gain adjust means includes means for measuring the value of said signature resistor.

4. The circuit of claim 3 wherein said signature resistor comprises a network of resistors.

5. The circuit of claim 3 wherein said amplifier means comprises:

an amplifier having an input coupled to the input signal source and having an output;

a first resistor having a first terminal coupled to the input of said amplifier and having a second terminal;

a second resistor having a first terminal coupled to the output of said amplifier and having a second terminal coupled to the second terminal of said first resistor;

a variable resistance device having a first terminal coupled to said gain adjust means for receiving said gain adjust signal, said variable resistance having a resistance value which varies in response to the gain adjust signal, said variable resistance device having a second terminal coupled to the second terminal of said first resistor and coupled to the second terminal of said second resistor, and having a third terminal coupled to a reference potential.

6. The circuit of claim 3 wherein said amplifier means comprises:

multiplier means for generating an output signal representative of the product of two input signals, said multiplier means having a first input terminal coupled to the input signal source and having a second input terminal coupled to said gain adjust means for receiving said gain adjust signal, and having an output terminal for transmitting the output signal; and an amplifier having an input terminal coupled to said output terminal of said multiplier and having an output terminal coupled to said deflection means.

7. A circuit for deflecting an electron beam in a cathode ray tube, in response to an input signal from an input signal source, said circuit comprising:

amplifier means for supplying current in response to the input signal, said amplifier means having an input coupled to the input signal source for receiving the input signal, said amplifier means having an output for transmitting the supplied current, and further having a gain adjust input and an adjustable gain, said gain being adjustable in response to a gain adjust signal received at said gain adjust input, said gain defining the value of current supplied at said output in response to the value of the input signal;

deflection means, coupled to the output of said amplifier means, for deflecting an electron beam in response to the current supplied by said amplifier means, said deflection means having a predetermined characteristic deflection sensitivity descriptive of the amount of beam deflection produced in response to the value of the supplied current;

a signature resistor having a resistance value indicating the deflection sensitivity of said deflection means, said signature resistor having a first terminal and having a second terminal coupled to a reference potential; and gain adjust means for measuring the deflection sensitivity of said deflection means by measuring the value of said signature resistor and for generating, in response to the resistance of said signature resistor, a gain adjust signal for adjusting the gain of said amplifier, said gain adjust means comprising:

means coupled to the first terminal of said signature resistor for measuring the resistance of said resistor and for generating, in response to the measured resistance, a digital signal having a digital value representative of the measured resistance value, said measuring and generating means having an output for transmitting the digital representation of the resistance value;

look-up means having an input coupled to the output of said measuring and generating means for receiving said digital representation of said resistance value, said look-up means having an output and being responsive to the digital representation of the resistance value for generating at said output a digital representation of a gain adjustment value; and digital-to-analog converter means having an input coupled to the output of said look-up means for receiving said generated digital representation of said gain adjustment value and for converting said digital gain adjustment value to an analog gain adjust signal, said digital-to-analog converter means having an output coupled to the gain adjust input of said amplifier means for transmitting said gain adjust signal to said amplifier means.

8. A circuit for deflecting an electron beam in a cathode ray tube, in response to an input signal from an input signal source, said circuit comprising:

amplifier means for supplying current in response to the input signal, said amplifier means having an input coupled to the input signal source for receiving the input signal, said amplifier means having an output for transmitting the supplied current, and further having a gain adjust input and an adjustable gain, said gain being adjustable in response to a gain adjust signal received at said gain adjust input, said gain defining the value of current supplied at said output in response to the value of the input signal;

deflection means, coupled to the output of said amplifier means, for deflecting an electron beam in response to the current supplied by said amplifier means, said deflection means having a predetermined characteristic deflection sensitivity descriptive of the amount of beam deflection produced in response to the value of the supplied current;

a signature resistor having a resistance value indicating the deflection sensitivity of said deflection means, said signature resistor having a first terminal and having a second terminal coupled to a reference potential; and gain adjust means for measuring the deflection sensitivity of said deflection means by measuring the value of said signature resistor and for generating, in response to the resistance of said signature resistor, a gain adjust signal for adjusting the gain of said amplifier, said gain adjust means comprising:

ohm meter means coupled to the first terminal of said signature resistor for measuring the resistance of said signature resistor;

analog-to-digital converter means having an input coupled to said ohm meter means for receiving the measured resistance value and converting said resistance value to a digital representation, said digital-to-analog converter means having an output for transmitting the digital representation of the resistance value;

look-up means having an input coupled to the output of said analog-to-digital converter means for receiving said digital representation of said resistance value, said look-up means having an output and being responsive to the digital representation of the resistance value for generating at said output a digital representation of a gain adjustment value; and digital-to-analog converter means having an input coupled to the output of said look-up means for receiving said generated digital representation of said gain adjustment value and for converting said digital gain adjustment value to an analog gain adjust signal, said digital-to-analog converter means having an output coupled to the gain adjust input of said amplifier means for transmitting said gain adjust signal to said amplifier means.

9. A deflection assembly for use in a cathode ray tube in combination with an amplifier circuit, said amplifier circuit being operative to measure an identifying value on said deflection assembly and having a gain which is adjustable in response to said measured identifying value, said deflection assembly comprising:

deflection means, adapted for being coupled to the amplifier circuit, for deflecting an electron beam in response to a current supplied by the amplifier circuit, said deflection means having a predetermined characteristic deflection sensitivity descriptive of the amount of beam deflection produced in response to the value of the supplied current; and means attached to said deflection means and having a fixed predetermined value for identifying the value of the deflection sensitivity of said deflection means, said identifying means being adapted for being measured by said amplifier circuit.

10. The assembly of claim 9 wherein said identifying means comprises a signature resistor having a resistance value indicating the deflection sensitivity of said deflection means, said signature resistor having a first terminal coupled to a reference potential and a second terminal adapted to be coupled to the amplifier circuit.

11. The assembly of claim 10 wherein said signature resistor comprises a network of resistors, said network having a resistance value indicating the deflection sensitivity of said deflection means.

12. A circuit for supplying current to a cathode ray tube (CRT)/deflection coil assembly in response to an input signal from an input signal source, said CRT/deflection coil assembly including a CRT, a deflection coil, and means for measurably indicating the deflection sensitivity of the deflection coil, said circuit comprising:

amplifier means for supplying current in response to the input signal, said amplifier means having an input coupled to the input signal source for receiving the input signal, and having an output coupled to the deflection coil for transmitting the supplied current, and further having a gain adjust input and an adjustable gain, said gain being adjustable in response to a gain adjust signal received at said gain adjust input, said gain defining the value of the current supplied at the output in response to the value of the input signal; and gain adjust means coupled to the deflection sensitivity indicating means for measuring the deflection sensitivity of the deflection coil, said gain adjust means being coupled to the gain adjust input of said amplifier means for generating and transmitting a gain adjust signal for adjusting, in response to said measured deflection sensitivity, the gain of said amplifier, said gain adjust means including look-up means for converting a digital representation of the measured defection sensitivity to a digital representation of the gain adjust signal.

13. The circuit of claim 12 wherein said gain adjust means are operative to adjust the gain of said amplifier means so that a predetermined amount of beam deflection is produced by said deflection coil in response to a predetermined value of the input signal, independently of the deflection sensitivity of the deflection coil.

14. The circuit of claim 13 wherein said amplifier means comprises:

an amplifier having an input coupled to the input signal source and having an output coupled to the deflection coil;

a first resistor having a first terminal coupled to the input of said amplifier and having a second terminal;

a second resistor having a first terminal coupled to the output of said amplifier and having a second terminal coupled to the second terminal of said first resistor;

a variable resistance device having a first terminal coupled to said gain adjust means for receiving said gain adjust signal, said variable resistance having a resistance value which varies in response to the gain adjust signal, said variable resistance device having a second terminal coupled to the second terminal of said first resistor and coupled to the second terminal of said second resistor, and having a third terminal coupled to a reference potential.

15. The circuit of claim 13 wherein said amplifier means comprises:

a multiplier means for generating an output signal representative of the product of two input signals, said multiplier means having a first input terminal coupled to the input signal source and having a second input terminal coupled to said gain adjust means for receiving said gain adjust signal, and having an output terminal for transmitting the output signal; and an amplifier having an input terminal coupled to said output terminal of said multiplier and an output coupled to the deflection coil.

16. A circuit for supplying current to a cathode ray tube (CRT)/deflection coil assembly in response to an input signal from an input signal source, said CRT/deflection coil assembly including a CRT, a deflection coil, and a signature resistor indicating the deflection sensitivity of the deflection coil, said circuit comprising:

amplifier means for supplying current in response to the input signal, said amplifier means having an input coupled to the input signal source for receiving the input signal, and having an output coupled to the deflection coil for transmitting the supplied current, and further having a gain adjust input and an adjustable gain, said gain being adjustable in response to a gain adjust signal received at said gain adjust input, said gain defining the value of the current supplied at the output in response to the value of the input signal; and gain adjust means for measuring the deflection sensitivity of the deflection coil by measuring the resistance of the signature resistor and for generating, in response to the resistance of said signature resistor, a gain adjust signal for adjusting the gain of said amplifier means, said gain adjust means comprising:

measuring and generating means coupled to said signature resistor for measuring the resistance of said resistor and for generating, in response to the measured resistance, a digital signal having a digital value representative of the measured resistance value, said measuring and generating means having an output for transmitting the digital representation of the resistance value;

look-up means having an input coupled to the output of said measuring and generating means for receiving said digital representation of said resistance value, said look-up means having an output and being responsive to the digital representation of the resistance value for generating at said output a digital representation of a gain adjustment value; and digital-to-analog converter means having an input coupled to the output of said look-up means for receiving said generated digital representation of said gain adjustment value and for converting said digital gain adjustment value to an analog gain adjust signal, said digital-to-analog converter means having an output coupled to the gain adjust input of said amplifier means for transmitting said gain adjust signal to said amplifier means.

17. A circuit for supplying current to a cathode ray tube (CRT)/deflection coil assembly in response to an input signal from an input signal source, said CRT/deflection coil assembly including a CRT, a deflection coil, and a signature resistor indicating the deflection sensitivity of the deflection coil, said circuit comprising:

amplifier means for supplying current in response to the input signal, said amplifier means having an input coupled to the input signal source for receiving the input signal, and having an output coupled to the deflection coil for transmitting the supplied current, and further having a gain adjust input and an adjustable gain, said gain being adjustable in response to a gain adjust signal received at said gain adjust input, said gain defining the value of the current supplied at the output in response to the value of the input signal; and gain adjust means for measuring the deflection sensitivity of the deflection coil by measuring the resistance of the signature resistor and for generating, in response to the resistance of said signature resistor, a gain adjust signal for adjusting the gain of said amplifier means;

said gain adjust means comprising:

ohm meter means coupled to the the signature resistor for measuring the resistance of the signature resistor;

analog-to-digital converter means having an input coupled to said ohm meter means for receiving the measured resistance value and converting said resistance value to a digital representation, said digital-to-analog converter means having an output for transmitting the digital representation of the resistance value;

look-up means having an input coupled to the output of said analog-to-digital converter means for receiving said digital representation of said resistance value, said look-up means having an output and being responsive to the digital representation of the resistance value for generating at said output a digital representation of a gain adjustment value; and digital-to-analog converter means having an input coupled to the output of said look-up means for receiving said generated digital representation of said gain adjustment value and for converting said digital gain adjustment value to an analog gain adjust signal, said digital-to-analog converter means having an output coupled to the gain adjust input of said amplifier means for transmitting said gain adjust signal to said amplifier means.

* * * * *